350-3.84        SR
      XR    3,603,682

United States Patent

[11] 3,603,682

[72] Inventors  Nicholas K. Sheridon
               Fairport, N.Y.;
               Daniel C. Kowalski, Southgate, Mich.
[21] Appl. No. 848,423
[22] Filed      Aug. 8, 1969
[45] Patented   Sept. 7, 1971
[73] Assignee   The United States of America as
                represented by the Secretary of the United
                States Air Force

[54] SYSTEM FOR GENERATING INSTANT
     CONTOURS FROM STEREO PAIRS OF AERIAL
     PHOTOGRAPHS
     5 Claims, 7 Drawing Figs.
[52] U.S. Cl. ........................................... 356/2,
                                                   350/3.5
[51] Int. Cl. ................................. G01c 11/04,
                                                     G02b
[50] Field of Search ........................... 356/2, 71;
                                             350/3.5, 162 SF

[56]           References Cited
           UNITED STATES PATENTS
3,552,858   1/1971   Haines et al. ............... 356/3.5 X
               OTHER REFERENCES Haines et al.: " Contour Generation by Wavefront Reconstruction" Physics Letter, Vol. 19, No. 1, Sept. 15, 1965, pages 10 and 11
  Hildebrand et al.: " The Generation of Three-Dimensional Contour Maps by Wavefront Reconstruction," Physics Letters, Vol. 21, No. 4, June 1, 1966 pg. 422, 423

Primary Examiner—Ronald L. Wibert
Assistant Examiner—F. L. Evans
Attorneys—Harry A. Herbert, Jr. and Jacob N. Erlich ABSTRACT: A system for generating instant contours from stereo pairs of aerial photographs. The optical system operates on all information on both aerial photographs simultaneously and in parallel instead of using a scanning technique as is commonly done.

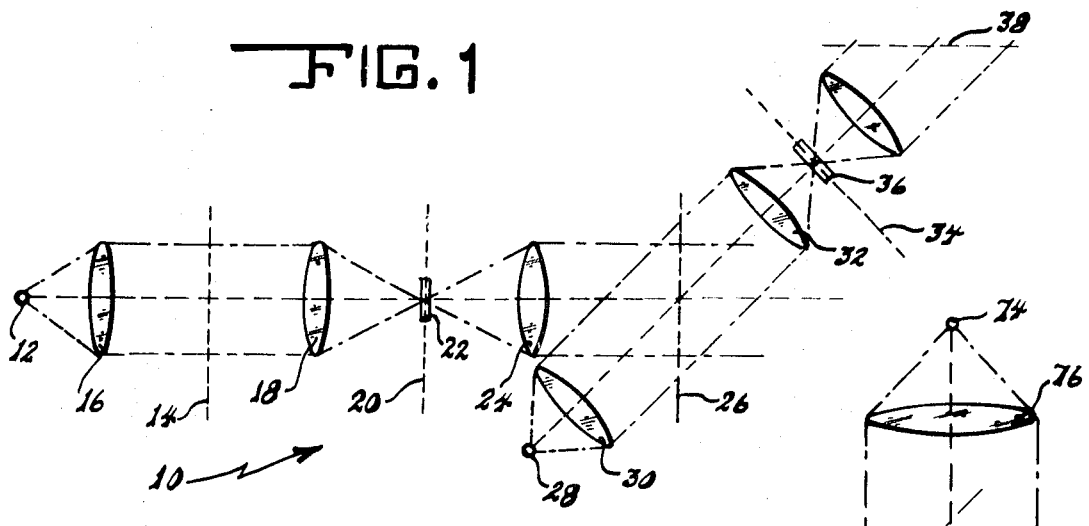
FIG. 1
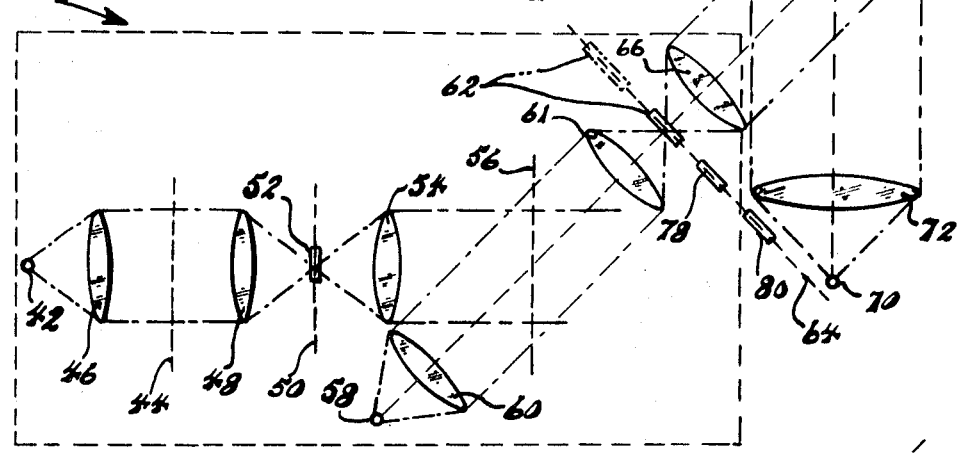
FIG. 2
FIG. 3
INVENTORS
NICKOLAS K. SHERIDON
DANIEL C. KOWALSKI
BY Harry A. Herbert Jr.
and
Jacob N. Erlich
ATTORNEYS INVENTORS
NICKOLAS K. SHERIDAN
DANIEL C. KOWALSKI
BY Harry A. Herbert Jr
and Jacob N. Erlich
ATTORNEYS

SYSTEM FOR GENERATING INSTANT CONTOURS FROM STEREO PAIRS OF AERIAL PHOTOGRAPHS

BACKGROUND OF THE INVENTION

This invention relates generally to an optical system, and more particularly to a series of coherent optical systems that will perform instant contouring from stereo pairs of serial photographs.

A major source of military intelligence information is airphoto interpretation. Analysis of terrain elements gives data on observation points, cover and concealment, trafficability, routes for movement of men and equipment and obstacles thereto, suitability for various types of military installations, and characteristics of beaches which affect landing operations. Tactical interpretation aids in camouflage detection and location and appraisal of fortifications, gun emplacements, airfields, supply depots, naval bases, and other military factors.

Generally such photos are made along parallel flight lines, overlapping along and between lines so as to give a continuous composite picture of the earth's surface. Methods are in use for measuring of heights, slope inclinations, distances, and directions directly from photos, and for making planimetric and contour maps. Through airphoto interpretation utilizing the three-dimensional view provided by overlapping photos viewed under the stereoscope, qualified specialists can obtain a wide range of scientific and engineering information on natural and cultural features of the earth's surface.

SUMMARY OF THE INVENTION

The instant invention sets forth several systems of generating contours from stereo pairs of aerial photographs. The isoaltitude contours or contour intervals may be generated or separated from the surrounding imagery by performing a correlation process between the conjugate pair of stereo photographs. The light resulting from this correlation process is separated from noncorrelation light or treated in such a way to identify it with respect to the noncorrelation light. By the techniques of the instant invention set forth in detail hereinbelow light may be reimaged to form contours or in turn may be used to reimage the image data from which contour intervals were made.

By "instant contouring" it is meant that the optical system of this invention operates on all the information on both photographs simultaneously and in parallel instead of using a scanning technique as is commonly done. The inherent advantages of coherent optical systems for doing instant contouring are principally speed and accuracy resolution.

Isoaltitude contours can be produced by the present systems described hereinbelow in a number of forms. These contours may be dark lines superimposed on imagery or standing alone. They may be bright lines superimposed on the imagery or produced separately. Some systems will even extract separate from the rest of the photographic image that imagery which lies within a contour interval. Another advantage of the coherent optical system of this invention is the manner in which isoaltitude information can be extracted from the images. It will be seen that among the principal differences among the contour generating systems described is the ability to minimize the noise introduced during the contouring process.

The imagery may be introduced in two forms in many of the optical systems set forth below. The imagery may be introduced as amplitude modulation which is the case of an ordinary photograph. It may also be introduced as a pure phase function. This is generally obtained by bleaching an ordinary photograph. In the bleaching process, the emulsion is shrunken in proportion to the intensity of light that originally exposed the photograph. There is essentially no information lost in this process. It will be seen, however, that the use of bleached photographs will, in some cases, tend to minimize the noise introduced in the contouring system. It is expected that when bleached functions are used care will be required in making certain that corresponding bits of imagery on the two stereo photographs are processed so as to provide the same depth of modulation. That is, the shrinkage of the two photographs for a given piece of information will be essentially the same.

It is therefore an object of this invention to provide an instant contouring system which is accomplished with great speed and yet is highly accurate.

It is another object of this invention to provide a coherent optical system in which isoaltitude information can be extracted from images.

It is still another object of this invention to provide a contour generating system which produces a minimum of noise during the contouring process.

For a better understanding of the present invention, together with other and further objects thereof, reference is had to the following description taken in connection with the accompanying drawing.

DESCRIPTION OF THE DRAWING

FIG. 1 represents a schematic view of the first instant contouring system of this invention;

FIG. 2 represents a schematic view of the second instant contouring system of this invention;

FIG. 3 represents a schematic view of the third instant contouring system of this invention;

DESCRIPTION OF THE PREFERRED EMBODIMENTS

First System

Figure 4:
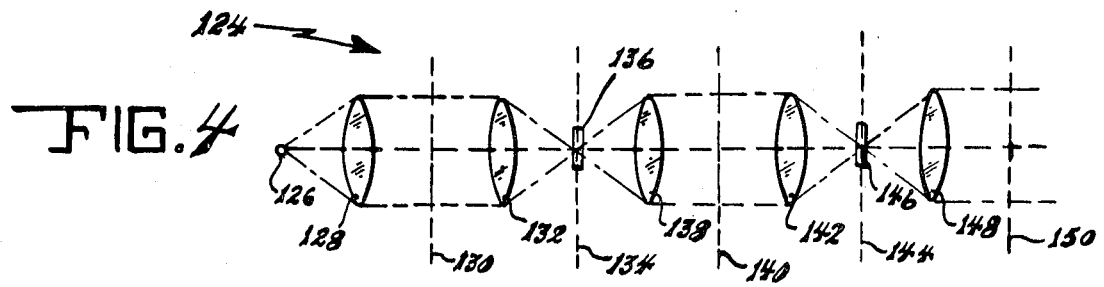
FIG. 4 represents a schematic view of the fourth instant contouring system of this invention.

The schematic diagram of the first system 10 is shown in FIG. 1. A monochromatic, coherent, light source is positioned at point 12 and one of the stereo photographs is placed in plane 14. A pair of spherical lenses 16 and 18 are placed at either side of plane 14. The stereo photographs may be a bleached function or on amplitude function. A Fourier transform of this photograph forms in plane 20 where a high-pass filter 22 removes the direct current or DC term and the low spatial frequencies that provide poor correlation discrimination. The photograph is again imaged without the DC term through spherical lens 24 in plane 26, where it is recorded as a hologram by means of monochromatic reference beam 28 through spherical lens 30. The second stereo photograph is now placed in plane 14. The hologram in plane 26 has recorded both the first stereo photograph and its complex conjugate. The imagery of the second photo will now be multiplied times the complex conjugate of the imagery of the first photograph in plane 26. Those regions that correlate, namely all the information in a given isoaltitude contour interval, will form the plane correlation wave. This will have the shape of the contour interval. If the input functions have not been bleached, this will be an amplitude modulated plane correlation wave. A transform of this wave is taken through spherical lens 32 in plane 34 where a low-pass filter 36 removes all but the zero spatial frequency component of the correlation function. In plane 38 will be imaged those regions of the imagery in plane 26 that have been correlated. This light distribution is a single isoaltitude interval. It contains no image information per se. If the functions had not been bleached, this isoaltitude interval will be characterized by a random distribution of low spatial frequency noise. If bleached, this noise will not be present. A further advantage of the bleaching process occurs when the functions are bleached to a very large depth of modulation. This will destroy the correlation process in all but those regions which overlie very exactly. This will give rise to a contour image in plane 38 of a very narrow altitude interval. If the second stereo photograph is now placed in plane 38, the imagery in this isoaltitude contour interval alone will be illuminated. Other isoaltitude contour intervals may be obtained by moving the second aerial photograph along the flight line.

Second System

The second system 40 is a variation of system 10 with certain advantages and is shown in FIG. 2. With system 40 the contours can be presented in three forms.

To operate the second system 40, a monochromatic, coherent light source is positioned at 42, the first of the stereo pair of aerial photographs is placed in plane 44. Again as in FIG. 1 a pair of spherical lenses 46 and 48 are placed at either side of plane 44. The Fourier transform is taken in plane 50 where low spatial frequencies that provide poor correlation are removed by filter 52. The filtered photograph is imaged through spherical lens 54 in plane 56 where, by means of a monochromatic reference beam originating at point 58 through lens spherical 60 a hologram is made. The stereo photographs in this case may or may not be bleached. If one is bleached, the other one must also be bleached. Stereo photograph No. 2 is now placed in plane 44 and its image in plane 56 will multiply against the complex conjugate of the image of aerial photograph No. 1 as recorded on the hologram. This gives rise to a plane correlation wave moving in the reference beam direction for those portions of the two photographs that are lined up correctly. As before, these portions define an isoaltitude contour interval. We may treat this cross-correlation light in three ways now.

In the first of these spherical lens 61 is positioned after plane 56 and a low-pass filter 62 is placed in plane 64. The filtered light is reimaged through lens spherical 66 in plane 68 where by means of a monochromatic reference beam originating at 70 and passing through spherical lens 72 is recorded as a hologram. The isoaltitude contour interval will now be a bright patch of light in plane 68. As before, if the functions were not phase functions, there will be predominant low-frequency noise across the light distribution. This is one presentation of the contours. To obtain another presentation of the contours, monochromatic reference beam originating at 74 is turned on in place of the beam at 70. The beam at 74 moves in the opposite direction to the beam at 70 and passing through spherical lens 76 has the effect of creating the conjugate image moving back along the optical system. This is identical to the light which originally exposed the hologram except for the direction of propagation. The low spatial frequency filter 62 in plane 64 can now be removed (shown in phantom). The correlation light will now illuminate the hologram in plane 56. The imagery in the isoaltitude contour interval being treated will now be projected in plane 44. All other imagery will be heavily suppressed or absent. In this manner the contour interval is presented explicitly in terms of the imagery contained within it.

A second variation of this involves placing a very small half-wave plate 78 of diameter equal to the diameter of the low-pass filter 62 that might ordinarily be placed in plane 64 instead of filter 62. Thus, all the light moving in the reference beam direction, whether correlation light or not, is recorded in plane 68 as a hologram. The half-wave plate 78 is now removed from plane 64 and by means of reference beam from point 74 the imagery is reprojected down the axis. Assume now that the stereo aerial photographs have been bleached so they are pure phase functions. The product of this reprojected light with the hologram in plane 56 will give rise to an image of stereo photo No. 2 reprojected down the horizontal optical axis. This will reform in plane 44 as expected. However, all imagery in the isoaltitude contour interval being considered will now be 180° out of phase with the surrounding imagery. In regions of overlap, there will be a narrow, dark interference band surrounding the isoaltitude contour interval. Thus, the imagery may be photographed intact in plane 44 with contour lines on it.

Variation number three in this contouring concept also takes place during the initial correlation process. Once again in place of the low-pass filter 62 in lane 64 a very small direct current or DC block 80 essentially a high-pass filter, is placed there. In plane 68 will form a random noise background with dark regions corresponding to the isoaltitude contour intervals superimposed on it. This may be superimposed on the imagery by recording the light in plane 68 as a hologram by means of reference beam originating at 70. Once again reference beam from 74 is used to reproject this light down the inclined optic axis. This light multiplies against the hologram in plane 56 and in plane 44 will form an image of aerial photograph 2. All information in the isoaltitude contour interval has now been removed, however, and will appear as a dark band against the imagery off aerial photo 2. Other isoaltitude contour intervals may be obtained by moving aerial photograph 2 along the flight line.

This system, therefore, will produce isoaltitude contours as bright bands, as dark bands, as dark bands superimposed upon imagery, as the imagery contained in the interval alone, or as dark bands surrounding the imagery in the interval and superimposed upon the surrounding imagery. This system has a disadvantage operationally. It requires using the light from a hologram to reconstruct a hologram. This means that light available for the final imaging step is very low in intensity. It will be seen that system three (shown below) circumvents this difficulty. This difficulty is not considered to be a fundamentally great disadvantage however.

Third System

The third system 82 shown in FIG. 3 is very similar to the second system 40. It has the advantages of more efficient handling and the ability to produce multiple contours simultaneously. Its basis is a recently developed correlation concept.

It is assumed that the aerial photographs used in this concept are bleached functions. This is not essential but it is felt the results will be much better in this case.

A monochromatic, coherent light source 84 passes its beam through spherical lens 86. An aerial photograph No. 1 is placed in plane 88. Another lens 90 is located after plane 88. The Fourier transform of photograph No. 1 is taken in plane 94 where a low-pass filter 96 removes those spatial frequencies which provide poor correlation. This photograph is reimaged through spherical lens 98 in plane 100 where it is bleached and made a pure phase function. The photograph is removed from plane 88 and the Fourier transform of the bleached photograph is taken in plane 102 after passing through spherical lens 101 where another low-pass filter 104 removes the DC component. The image is formed in plane 106 after passing through spherical lens 105 and the Fresnel diffraction pattern in plane 108 where a hologram is made by the aid of a monochromatic reference beam originating at 110 and passing through spherical lens 112. The second aerial photograph is now placed in plane 88 and a bleached copy is obtained in plane 100 as before, and the low-pass filter 96 is removed from plane 2 (shown in phantom). By means of the monochromatic reference beam from 114 through lens 116 the Fresnel diffraction pattern in plane 108 is now reconstructed moving down the optic axis in the opposite direction from which it originally came. This is identical to the original Fresnel diffraction pattern in every respect except the direction of propagation. What is effectively a complex conjugate image of aerial photograph 1 is now formed in plane 100 where it is multiplied against the bleached version of aerial photograph 2. Those portions of the two photographs in correlation, namely, the isoaltitude contour interval in question, will produce a plane unmodulated wave front. This correlation light is separated from noncorrelation light in plane 94 by means of low-pass filter 96 and imaged in plane 1. The contour interval is now a bright band of light of the correct shape. The amplitude version of aerial photograph 2 can now be reinserted in plane 88. Only that imagery in the isoaltitude contour interval will now be illuminated. This is one presentation of the contour information. A second presentation may as before be obtained by putting a half-wave plate 118 of small dimensions in plane 94 in place of filter 96. Now all the imagery on aerial photograph 2 will be illuminated. That which illuminates the information in the isoaltitude contour interval, however, will be 180° out of phase with the surrounding light, and this imagery will therefore be surrounded by a dark interference band which defines the interval. The third variation of this scheme involves placing a small DC block or high-pass filter 120 in plane 94 in place of filter 96. Now, all the imagery of aerial photograph 2 will be illuminated with the exception of the imagery contained in the isoaltitude contour under consideration. Other isoaltitude contour intervals may be obtained by moving aerial photograph 2 along the flight line.

In addition to the facility with which the various isoaltitude contours may be presented with this scheme, there is a possibility of presenting more than one isoaltitude contour at a time. This is done by placing a diffuse light source 111 (shown in phantom) in the back focal plane of lens 112 in reference beam from 110, or alternately, in placing several point sources in the back focal plane of lens 112. Each point of light in this new light source will now produce a reference beam which will reconstruct the entire Fresnel diffraction pattern of aerial photograph 1 recorded in plane 108. Each of these Fresnel diffraction patterns will be moving, however, in a somewhat different direction so that in plane 100 we will have a number of displaced images of aerial photograph 1 superimposed or multiplied against aerial photograph 2 in that plane. Different regions of imagery will now correlate. For each of these complete images a contour interval will be defined. Hence, a number of contouring intervals may be generated simultaneously. Obviously, in place of single low-pass filter 96 or the single DC block 120, or the half wave plate 118 in plane 94 we will now have as many of these as we have contour intervals we wish to generate.

We have the option with this presentation of multiple contours of only one way of presenting the contour information, however. A series of low-pass filters 122 must be placed in plane 94 whose separation and size will permit correlation light from only one isoaltitude contour interval to pass through each hole. The imagery placed in plane 88 will now be illuminated at only those positions where the isoaltitude contours have been found.

FOURTH SYSTEM

The fourth system 124 is based upon the so-called image-image correlator. This system is shown in FIG. 4. A monochromatic, coherent light source 126 is located before spherical lens 128. Aerial photograph 1 is placed in plane 130. Its Fourier transform is produced after passing through spherical lens 132 in plane 134 where a high-pass filter 136 will remove those spatial frequencies which provide poor correlation. This is reimaged after passing spherical lens 138 in plane 140. Also, in plane 140 is placed aerial photograph 2. In those regions of the two photographs which correlate (determined by the alignments of the aerial photographs along the flight line) a plane correlation wave will be generated. This will be focused after passing spherical lens 142 to a point in plane 144. The correlation light will be separated from the surrounding light by means of a low-pass filter 146 in plane 144 and reimaged after passing spherical lens 148 in plane 150. Photograph 2 may be placed in plane 150; the correlation light will illuminate all the imagery in the isoaltitude contour under consideration. The input functions may be bleached or unbleached. It is felt that there will be less extraneous noise generation if the input functions are bleached. However, it is also felt that in this particular configuration the depth of modulation of the bleaching process should not be too great.

A very distinct advantage of this correlation scheme is that it does not require the time delay involved in making a hologram.

FIFTH SYSTEM

Figure 5:
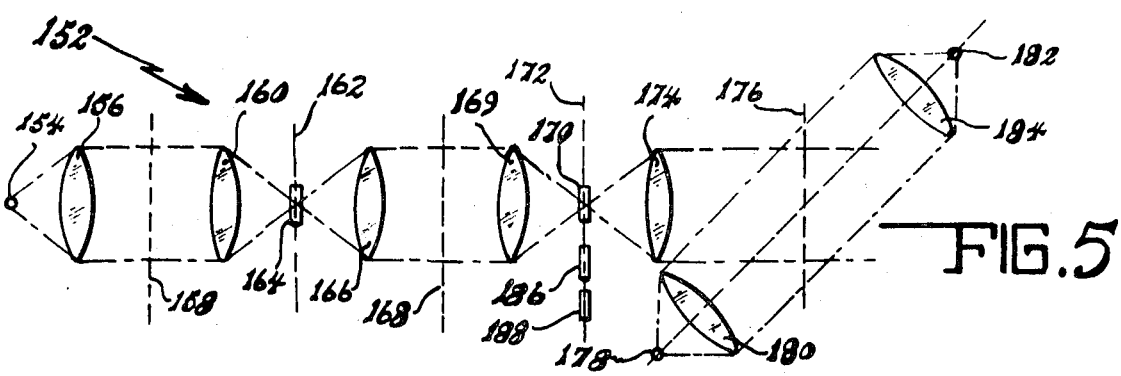
FIG. 5 represents a schematic view of the fifth instant contouring system of this invention.

System 152 is a variation of the fourth system 124 modified to provide a greater precision and versatility of contour interval presentation. This is shown clearly in FIG. 5.

To be an advantage, the aerial photographs used in this concept must be bleached.

As before a monochromatic, coherent light source 154 passes its beam through spherical lens 156. Aerial photograph 1 is placed in plane 158. Its Fourier transform after passing spherical lens 160 is taken in plane 162, low spatial frequencies are removed by filter 164 and after passing spherical lens 166 is reimaged in plane 168. Aerial photograph 2 is now placed in plane 168. We now have the option of the three variations that we had in system 40 shown in FIG. 2. The first variation is a low-pass filter 170 placed after lens 169 in plane 172. This passes the cross-correlation light, namely, light from a given isoaltitude contour interval, and after passing spherical lens 174 in plane 176 a bright band of light corresponding to this interval will form. This is recorded as a hologram by means of a monochromatic reference beam originating at 178 and passing spherical lens 180. This light may be reconstructed moving in the opposite direction down the axis by means of a monochromatic reference beam originating at 182 passing spherical lens 184. In plane 158 only that imagery that was present in the given iosaltitude contour interval will be illuminated and may be recorded by a photographic plate in that position. Variation No. 2 involves placing a very small diameter half wave plate 186 in place of filter 170 in plane 172 during the correlation process. The light is now recorded in plane 176 by means of monochromatic reference beam originating at 178. By means of reference beam from 182 all the imagery in stereo photograph No. 1 recovered in plane 158. That imagery contained in the given isoaltitude contour, however, will be 180° out of phase with the surrounding imagery and therefore, as before, this imagery will be surrounded by a dark interference band. Variation 3 involves replacing filter 170 with high-pass filter 188 in plane 172. Correlation light is now recorded in plane 176 by means of reference beam from 178 and by means of reference beam from 182 this light is passed again down the axis. In plane 158, all imagery contained in the given isoaltitude contour interval will appear as a dark band against the surrounding imagery. Motion of photograph 2 along the flight line will produce other isoaltitude contour intervals.

SIXTH SYSTEM

This system 190 makes use of the so-called matched-filter correlator. Like system 82 shown in FIG. 3 this scheme enables one to derive a number of contour intervals simultaneously.

Figure 6:
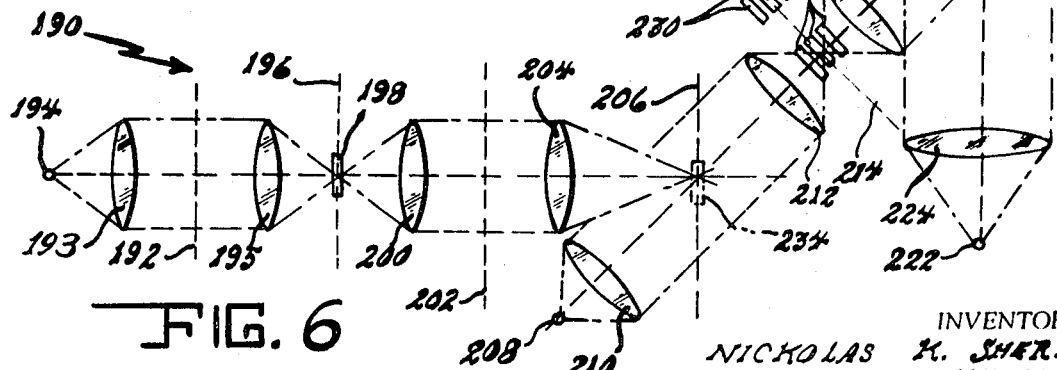
FIG. 6 represents a schematic view of the sixth instant contouring system of this invention.

The schematic drawing for this instant concept contouring is shown in FIG. 6. Aerial photograph 1 is placed in plane 192 after monochromatic, coherent light source 194 and spherical lens 193. (Amplitude modulating photographs are used). The Fourier transform is taken after passing spherical lens 195 in plane 196 to remove undersired low spatial frequencies by filter 198 and it is reimaged through spherical lens 200 in plane 202. After passing spherical lens 204 another Fourier transform is taken in plane 206 where it is recorded by means of a monochromatic reference beam originating at 208 and passing spherical lens 210 as a hologram, (or, in more common terms, a matched filter). Aerial photograph No. 2 is now placed in plane 192 and its Fourier transform forms in plane 206. The Fourier transform of aerial photograph 2 will now multiply against the complex conjugate of the Fourier transform of photograph 1 which is recorded on the hologram. Those portions of the two photographs which correlate will produce plane correlation wave fronts moving in the general direction of the reference beam originating at 208. Each isocontour interval will produce a plane wave front moving in a slightly different direction. The angle will be proportionate to the displacement of the isocontour intervals between the two photographs. Each will, therefore, come to a focus in a different position after passing spherical lens 212 in plane 214. We now have the option of following any one of three possible variations in this contouring scheme, depending upon the type of contour presentation we wish to obtain.

Variation 1 involves placing a series of low-pass filters 216 in plane 214. This is in essence a series of small holes on an opaque support. Each hole will pass in isoaltitude contour interval and as many intervals may be obtained as there are holes in plane 214. Correlation light passed through the holes on plane 214 is now imaged through spherical lens 218 on plane 220 and a hologram formed from it by means of monochromatic reference beam originating at 222 and passing spherical lens 224. The imagery in plane 220 is now a series of bright bands, each corresponding to a given isoaltitude contour interval. By means of monochromatic reference beam originating at 226 and passing spherical lens 228 the light information recorded in plane 220 may be reprojected back along the inclined optic axis. This is identical to the light which originally came up this optic axis (above plane 214), except for its direction of propagation. When this light is multiplied against this hologram in plane 206 the image will be reconstructed in plane 192. That is, the imagery contained in the isoaltitude contour intervals passed by the low spatial frequency filters 216 in plane 214 will appear in plane 192. Imagery not contained within these intervals will be presented as dark bands. Variation 2 in this concept involves placing a series of half wave plate 230 in place of filters 216 in plane 214 identical in size and position to the low-pass filters 216 in variation 1. Hence, all the correlation light will be passed on to plane 230. When this light is reformed by reference beam from 226 and the input image 2 is recovered in plane 192, the entire image will be present. However, that information contained in the isocontour intervals in question will be 180° out of phase with the surrounding imagery. Therefore, at the junction of isocontour intervals there will be a dark interference band, which will constitute our contour information. Variation 3 involves placing in plane 214 a series of high-pass filters 232 in place of filters 216 comprising of small DC blocks of size and position identical to the half wave plates 230 used in variation 2. We will then obtain in plane 192 once again the entire image of aerial photograph 2 with the exception of the imagery contained in the isocontour intervals which will be presented as dark bands.

As pointed out previously, one of the major advantages of system 190 is that, like system 82, it permits presentation of a number of isocontour intervals simultaneously. Unlike system 82, however, it permits presentation of more intervals before the introduction of noise becomes prohibitive. However, a drawback to system 190 lies in the fact that the matched filter recorded in plane 206 will contain both amplitude and phase information. This will amplitude modulate the correlation light with noise. This amplitude information may be eliminated by an inverse power spectrum filter 234 (shown in phantom) during the correlation process. That is, by a filter which records the power spectrum of the Fourier transform present in plane 206 in the denominator. Such a filter can be constructed by conventional hologram techniques using a reference beam which is exactly in line with the optic axis of the system. However, this will eliminate only the amplitude information on the matched filter due to the Fourier transform of aerial photograph 1.

SEVENTH SYSTEM

Figure 7:
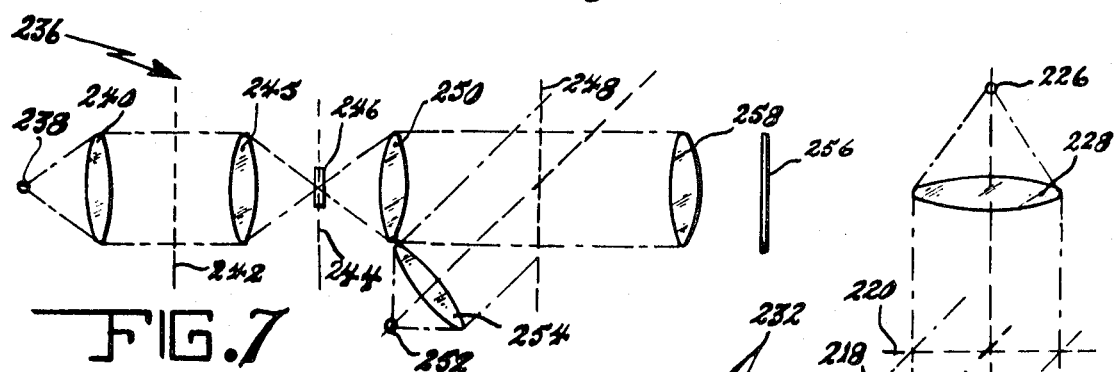
FIG. 7 represents a schematic view of the seventh instant contouring system of this invention.

This system 236 shown in FIG. 7 is an interferometric approach. Its main advantage lies in the ability to view all the isocontour intervals at a given time as a virtual image.

System 236 requires the use of bleached functions. Again a monochromatic, coherent light source 238 is positioned before spherical lens 240. A bleached version of aerial photograph 1 is placed in plane 242 in FIG. 7. The Fourier transform is taken in plane 244 where the DC term is removed by filter 246 after passing spherical lens 245. It is probably not necessary to remove low spatial frequencies other than the DC term. This function is reimaged in plane 248 after passing spherical lens 250 where it is recorded as a hologram by means of the indicated monochromatic reference beam originating at 252 and passing through spherical lens 254. It should be noted that plane 248 need not be an image plane; it could equally well be a Fresnel diffraction plane. Aerial photograph 2 is now placed in plane 242. This is a bleached function also, but it has some amplitude modulation. The indicated reference beam is turned on to reconstruct an image of aerial photograph 1 in plane 256 after passing lens 258 superimposed upon that of aerial photograph 2. If the phase in the illumination light or the reference beam light is now changed by λ2 dark interference bands will appear in plane 256 wherever the images are identical. It should be noted at this point that this technique requires rather precise control over the bleaching process so that both photographs have the same depth of modulation. The interference fringes appearing in plane 256 will be dark bands superimposed upon the image of aerial photograph 2. Since both photographs have been bleached they will superimpose a noise pattern on plane 256.

If a diffuse source is placed for the viewing process in place of the point source 238 used to make the hologram in plane 248 it is expected it will be possible to look along the axis of the system and see in plane 256 a single isoaltitude contour interval superimposed on the image of aerial photograph 2. If the position of the eye is changed it is expected another isoaltitude contour interval will replace the first and in this manner by sufficient motion all isoaltitude contour intervals should be visible. These may also be superimposed upon the image by placing aerial photograph 2 in plane 256.

Although the invention has been described with reference to particular embodiments, it will be understood to those skilled in the art that the invention is capable of a variety of alternative embodiments within the spirit and scope of the appended claims.

We claim:

1. A system for generating instant contours from stereo pairs of photographs comprising a monochromatic coherent light source, a first spherical lens adjacent said light source, a second spherical lens adjacent to and optically aligned with said first lens for producing in a first plane a Fourier transform of each of a pair of stereo photographs positioned between said first and second lens, a filter means located in said first plane for removing the direct current term from said transform, a third spherical lens adjacent to and optically aligned with said first plane for reimaging each of said photographs without said direct current term in a second plane, a second monochromatic light source located adjacent said third lens, a fourth spherical lens located adjacent said second light source, said second light source directing its light through said fourth spherical lens thereby forming a hologram of both said first photograph and its complex conjugate in said second plane, the imagery of said second photograph being multiplied times said complex conjugate of the imagery of said first photograph in said second plane, whereby those regions which correlate will form a plane correlation wave having the shape of the contour interval.

2. A system for generating instant contours from stereo pairs of photographs comprising a monochromatic coherent light source, a first spherical lens adjacent said light source, a second spherical lens adjacent to and optically aligned with said first lens for producing in a first plane a Fourier transform of each of a pair of stereo photographs positioned between said first and second lens, a filter means located in said first plane for removing the direct current term from said transform, and a third spherical lens adjacent to and optically aligned with said first plane for reimaging each of said photographs without said direct current term in a second plane, a fourth spherical lens in optical alignment with and adjacent said second plane, a second monochromatic light source located adjacent said fourth lens, a fifth spherical lens located adjacent said second light source, said second light source directing its light through said fifth lens thereby forming a hologram in a third plane located in optical alignment with and adjacent said fourth lens, a Fourier transform of said second photograph being multiplied against the complex conjugate of the Fourier transform of said first photograph recorded on said hologram, whereby those portions of said two photographs which correlate will produce plane correlation wave fronts and each isocontour will produce a plane wave front moving in a slightly different direction.

3. A system as defined in claim 2 wherein a low-pass filter is located in said third plane.

4. A system as defined in claim 2 wherein a half wave plate is located in said third plane.

5. A system as defined in claim 2 wherein a high-pass filter is located in said third plane.